US012439200B2

(12) United States Patent
Daftuar et al.

(10) Patent No.: US 12,439,200 B2
(45) Date of Patent: Oct. 7, 2025

(54) LOUDSPEAKER ASSEMBLY WITH A WAVEGUIDE

(71) Applicant: Harman International Industries, Incorporated, Stamford, CT (US)

(72) Inventors: Rishi Daftuar, Ypsilanti, MI (US); David Mossington, Rochester, MI (US); Matthew Christopher Marrocco, Novi, MI (US)

(73) Assignee: Harman International Industries, Incorporated, Stamford, CT (US)

( * ) Notice: Subject to any disclaimer, the term of this patent is extended or adjusted under 35 U.S.C. 154(b) by 358 days.

(21) Appl. No.: 18/090,185

(22) Filed: Dec. 28, 2022

(65) Prior Publication Data

US 2023/0217160 A1 Jul. 6, 2023

Related U.S. Application Data

(60) Provisional application No. 63/296,040, filed on Jan. 3, 2022.

(51) Int. Cl.

| | |
|---|---|
| ***H04R 1/34*** | (2006.01) |
| ***H04R 1/02*** | (2006.01) |
| ***H04R 1/30*** | (2006.01) |
| ***H04R 7/12*** | (2006.01) |

(52) U.S. Cl.

CPC ............ *H04R 1/345* (2013.01); *H04R 1/023* (2013.01); *H04R 1/025* (2013.01); *H04R 7/12* (2013.01); *H04R 1/30* (2013.01); *H04R 2499/13* (2013.01)

(58) Field of Classification Search

CPC ........ H04R 1/345; H04R 1/023; H04R 1/025; H04R 7/12; H04R 1/30; H04R 2499/13

USPC ........................................................ 381/86

See application file for complete search history.

(56) References Cited

U.S. PATENT DOCUMENTS

| | | | |
|---|---|---|---|
| 2,656,004 | A | 10/1953 | Olson |
| 4,158,400 | A | 6/1979 | Vice |
| 4,319,098 | A | 3/1982 | Baitcher |
| D342,948 | S | 1/1994 | Furui |
| D356,088 | S | 3/1995 | Jewitt et al. |
| D356,089 | S | 3/1995 | Hedaya |
| D389,152 | S | 1/1998 | Kurihara |
| D398,008 | S | 9/1998 | Yamakawa et al. |
| 6,493,452 | B1 | 12/2002 | Koizumi et al. |
| D515,068 | S | 2/2006 | White |
| D517,533 | S | 3/2006 | Yuasa et al. |

(Continued)

FOREIGN PATENT DOCUMENTS

| | | |
|---|---|---|
| CN | 205829991 U | 12/2016 |
| GB | 6216770 | 6/2022 |

(Continued)

OTHER PUBLICATIONS

Extended European Search Report dated Sep. 8, 2023 for European Patent Application No. 22217155.5, 36 pages.

(Continued)

*Primary Examiner* — Sean H Nguyen

(74) *Attorney, Agent, or Firm* — Brooks Kushman P.C.

(57) ABSTRACT

In at least one embodiment, a loudspeaker assembly is provided. The loudspeaker assembly includes a loudspeaker and a waveguide. The loudspeaker includes a diaphragm to transmit an audio output. The waveguide being asymmetrical and at least partially surrounding the diaphragm. The waveguide being configured to control a directivity of the audio output.

15 Claims, 10 Drawing Sheets

(56) References Cited

U.S. PATENT DOCUMENTS

| | | | |
|---|---|---|---|
| 8,160,285 | B2 | 4/2012 | Kragelund |
| D674,375 | S | 1/2013 | Robineau |
| D728,512 | S | 5/2015 | Nakagawa |
| D738,861 | S | 9/2015 | Yang |
| D767,541 | S | 9/2016 | Baird et al. |
| D783,570 | S | 4/2017 | Sprinkle |
| D799,686 | S | 10/2017 | Liu et al. |
| D800,696 | S | 10/2017 | Tubis et al. |
| D808,933 | S | 1/2018 | Noro et al. |
| D821,360 | S | 6/2018 | Moro |
| D822,006 | S | 7/2018 | Moro |
| D868,029 | S | 11/2019 | Hanggi et al. |
| D868,737 | S | 12/2019 | Roberts |
| D873,240 | S | 1/2020 | Roberts |
| D888,020 | S | 6/2020 | Lyu et al. |
| D895,576 | S | 9/2020 | Koehn |
| D950,523 | S | 5/2022 | Lee |
| D963,610 | S | 9/2022 | Smith et al. |
| D967,058 | S | 10/2022 | Fustino |
| D976,869 | S | 1/2023 | Brown et al. |
| 2005/0094836 | A1 | 5/2005 | Manrique |
| 2015/0365758 | A1 | 12/2015 | Bridge |
| 2017/0048610 | A1 | 2/2017 | Baird et al. |
| 2017/0155989 | A1 | 6/2017 | Jeon |
| 2020/0213756 | A1 | 7/2020 | Liang et al. |
| 2021/0256955 | A1 | 8/2021 | Vandijck et al. |
| 2021/0368260 | A1 | 11/2021 | Ferreira et al. |

FOREIGN PATENT DOCUMENTS

| | | |
|---|---|---|
| GB | 6216772 | 6/2022 |
| GB | 6216774 | 6/2022 |
| GB | 6216775 | 6/2022 |
| JP | H0358699 A | 3/1991 |
| JP | H03192900 A | 8/1991 |

OTHER PUBLICATIONS

Non-Final Office Action; related U.S. Appl. No. 29/821,793, filed Jan. 3, 2022; date of mailing Mar. 22, 2024, 15 pgs.
Non-Final Office Action; related U.S. Appl. No. 29/821,793, filed Jan. 3, 2022; date of mailing Jul. 17, 2024, 14 pgs.
European Search Report dated May 23, 2023 for European Patent Application No. 22217155.5, 15 pages.

LOUDSPEAKER ASSEMBLY WITH A WAVEGUIDE

CROSS-REFERENCE TO RELATED APPLICATIONS

This application claims the benefit of U.S. provisional application Ser. No. 63/296,040 filed Jan. 3, 2022, the disclosure of which is hereby incorporated in its entirety by reference herein.

TECHNICAL FIELD

Aspects disclosed herein generally relate to a loudspeaker assembly including at least a waveguide or horn. Specifically, one or more of the disclosed embodiments generally to a loudspeaker assembly including the waveguide or horn that may be used in connection with automotive audio applications. These aspects and other will be discussed in more detail below.

BACKGROUND

Loudspeaker assemblies are known to include a waveguide. The waveguide may be used to shape an overall directivity of audio transmitted from a loudspeaker. For example, the waveguide may be used to either narrow or widen the sound field of audio transmitted from the loudspeaker in different frequencies which may affect both soundstage and tonality. In automotive applications, it is desirable to implement loudspeaker assemblies such that the waveguide guides the audio toward one or more vehicle occupants.

SUMMARY

In at least one embodiment, a loudspeaker assembly is provided. The loudspeaker assembly includes a loudspeaker and a waveguide. The loudspeaker includes a diaphragm to transmit an audio output. The waveguide being asymmetrical and at least partially surrounding the diaphragm. The waveguide being configured to control a directivity of the audio output.

In at least one embodiment, a loudspeaker assembly is provided. The loudspeaker assembly includes a loudspeaker and a waveguide. The loudspeaker is positioned on a mirror sail, a body pillar, or a door trim of a vehicle. The loudspeaker includes a diaphragm to transmit an audio output in the vehicle. The waveguide at least partially surrounds the diaphragm and is configured to control a directivity of the audio output in the vehicle.

In at least one embodiment, a loudspeaker assembly is provided. The loudspeaker assembly includes a loudspeaker and a waveguide. The loudspeaker includes a diaphragm to transmit an audio output in a vehicle. The waveguide at least partially surrounds the diaphragm and is configured to transmit the audio output in both a vertical and horizontal direction in the vehicle.

BRIEF DESCRIPTION OF THE DRAWINGS

The embodiments of the present disclosure are pointed out with particularity in the appended claims. However, other features of the various embodiments will become more apparent and will be best understood by referring to the following detailed description in conjunction with the accompanying drawings in which:

DETAILED DESCRIPTION

Figure 1:
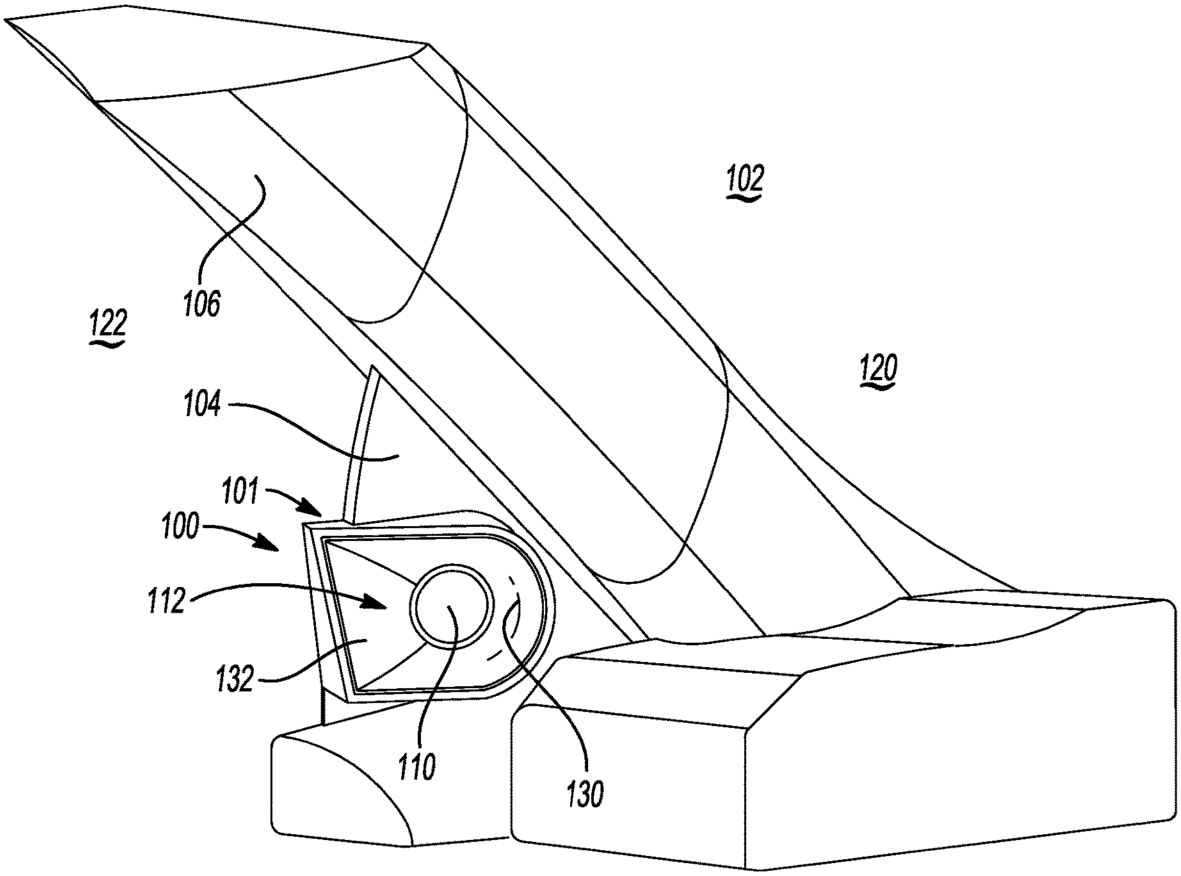
FIG. 1 depicts one example of a loudspeaker assembly positioned in a vehicle in accordance with an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Aspects disclosed herein generally provide a loudspeaker assembly having a waveguide that serves as an interface to improve directivity and efficiency for a loudspeaker. In one example, the loudspeaker may be a tweeter that transmits audio in a range of 1.5 kHz to 40 kHz. It is recognized herein that the loudspeaker may also be a woofer or a mid-range loudspeaker. The waveguide may be asymmetric and flared on a front side thereof. The waveguide may be lensed at a rear side. Such a surface geometry of the waveguide may, among other things, control a radiation or sound field of the audio output of the loudspeaker and optimize the transmission and receipt of the sound at occupant positions in a vehicle. The waveguide may provide, for example, a coverage angle of the transmitted audio for 60 degrees both in horizontal and vertical directions.

Aspects disclosed provide a loudspeaker assembly that was developed in response to, among other things, a problem of having to design and re-design horn/waveguides that are tailored to specific customer requirements for performance and packaging. The disclosed horn/waveguide includes a core structure having a creased flare and a continuous blend in its surface geometry. The stability in performance realized with the core surface geometry of the waveguide creates a horn/waveguide that can accommodate a variety of exterior (trim) shapes without affecting overall performance. For this reason, the core can be re-used across many vehicles and only modifications to the exterior shape may need to be made. The geometry of the loudspeaker's core (or diaphragm) may remain the same regardless of specific customer requirements. The disclosed loudspeaker assembly generally incorporates at least a diaphragm and a waveguide including a creased flare, a continuous blend, and an asymmetrical convex surface that morphs or evolves into a concave surface (or acoustic lens). The core or diaphragm may generally remain the same and its surrounding surface area that forms the waveguide may be easily fine-tuned to accommodate slight adjustments necessary that allow the diaphragm to fit any outer trim shape necessary to accommodate specific customer requirements without affecting performance.

An outer trim, (that may nor may not necessarily be modular or separate from the diaphragm), can be modified without affecting the overall performance of the core. Due to the surface geometry of the core, the shape of the trim portion may be changed, based on vehicle packaging requirements, without affecting performance. The waveguide of the loudspeaker assembly may utilize a creased flare on a front surface thereof and a continuous blend for remaining surfaces of the waveguide. The waveguide may include 4 cross sectional areas or sections in which three of such sections may be convex. The rear cross sections of the waveguide start as a convex portion and blend into a concave surface.

One object provided by the waveguide and its specific geometry may control the directivity of the loudspeaker provided to occupants in the vehicle and may remove sound from unnecessary locations in the vehicle. The disclosed loudspeaker assembly may (i) improve direction of the sound waves toward the location of listeners (e.g., focus sound at the location of the users and remove the sound from being projected or transmitted toward unnecessary locations (i.e., improves directivity)), (ii) create a similar listening experience over the coverage area, (iii) create a similar listening experience (e.g., frequency response) across height/head locations, (iv) increase output of, for example, a high-frequency loudspeaker, and (v) achieve above listed audio performance improvement in a small form factor. Prior implementations of loudspeaker assemblies may not provide a horn or waveguide or do not have as much directivity control of direct sound within the automotive space. It is recognized that the at least a portion of the acoustic function provided the loudspeaker assembly may be dictated or controlled by the surface geometry of the waveguide.

FIG. 1 depicts one example of a loudspeaker assembly 100 positioned in a vehicle 102 in accordance with an embodiment. In general, the loudspeaker assembly 100 includes a loudspeaker 101 and is configured to transmit an audio output to one or more vehicle occupants in the vehicle

102. As shown, the assembly 100 may be positioned in a mirror sail 104 of the vehicle 102. However, it is recognized that the assembly 100 may by positioned anywhere along an A-pillar 106 of the vehicle 102. In general, the loudspeaker assembly 100 may be configured to transmit the audio output to one or more vehicle occupants positioned in at least a first row of the vehicle 102. While not shown, the loudspeaker assembly 100 may be positioned anywhere along B, C and/or D pillars of the vehicle 102 to transmit the audio output to at least vehicle occupants positioned in a second row and/or third row of the vehicle 102. It is further recognized that the loudspeaker assembly 100 may be positioned on any one or more of the A, B, C, or D pillars (body pillar) of the vehicle 102. It is also recognized that the assembly 100 may be positioned in any door trim that is located in the vehicle 102.

Similarly, while FIG. 1 illustrates that the loudspeaker assembly 100 may be positioned on a left side of the vehicle 102 (e.g., driver side of the vehicle 102), it is recognized that there may be an additional loudspeaker assembly 100 positioned opposite to the loudspeaker assembly 100 on a right side of the vehicle 102 and on a mirror sail 104 (or body pillar 106 such as an A-pillar) of the vehicle 102. In generally, the loudspeaker assembly 100 may be positioned as a pair of assemblies for any given row of seating in the vehicle 102. Likewise, the assembly 100 may be positioned on right and left door trims for one or more rows of seating in the vehicle 102

The loudspeaker assembly 100 includes a diaphragm 110 and a waveguide (or horn) 112. The diaphragm 110 along with at least a voice coil (not shown) form the loudspeaker 101 of the assembly 100. It is recognized that the loudspeaker 101 may be a tweeter that transmits audio in a range of 1.5 kHz to 40 kHz. It is recognized herein that the loudspeaker may also be a woofer or a mid-range loudspeaker.

The waveguide 112 generally surrounds the diaphragm 110 and serves to control the directivity of the audio output toward vehicle occupants while simultaneously preventing the audio output from being directed towards a front windshield 120 of the vehicle 102 and/or a door windshield 122. The waveguide 112 includes a first (or rear) portion 130 and a second (or front) portion 132. The first portion 130 may generally be defined as a "continuous blend 130" and the second portion 132 may be defined as a "creased flare 132" hereafter. Aspects related to the continuous blend 130 and the creased flare 132 will be discussed in more detail in connection with FIGS. 2-6. The continuous blend 130 and the creased flare 132 cooperate with one another to provide a horn that increases the efficiency of the frequency of the audio output from the loudspeaker 101. For example, the continuous blend 130 and the creased flare 132 may increase the overall power output of the audio transmitted by the loudspeaker 101.

Figure 2:
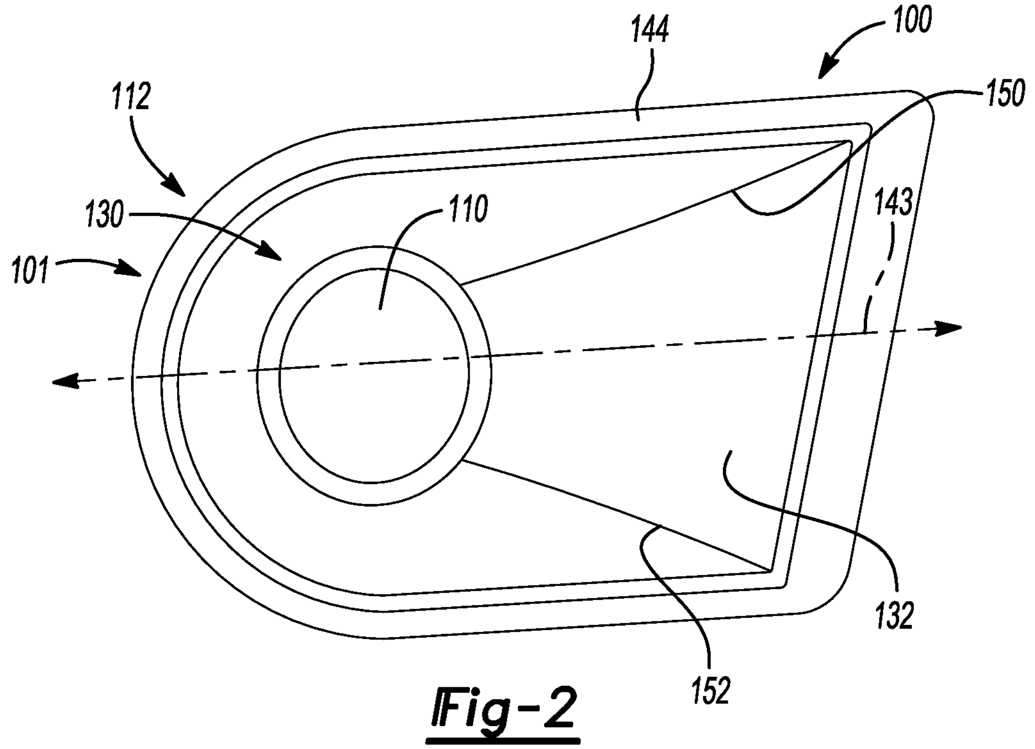
FIG. 2 depicts a front view of the loudspeaker assembly of FIG. 1 in accordance with an embodiment.

FIG. 2 depicts a front view of the loudspeaker assembly 100 of FIG. 1 in accordance with an embodiment. As shown, the diaphragm 110 is generally recessed within the waveguide 112. The diaphragm 110 is radially surrounded by the continuous blend 130 and the creased flare 132. An outer lip 144 surrounds the continuous blend 130 and the creased flare 132. The continuous blend 130 may be formed or shaped in a cone-like manner and the creased flare 132 includes a first crease 150 and a second crease 152 for separating the continuous blend 130 from the creased flare 132. It is recognized that any number of creases may be provided on the creased flare 132. Similarly, the creases may be positioned on the continuous blend 130 instead of the on the creased flare 132. The number of creases positioned on the continuous blend 130 or the creased flare 132 may vary based on the desired criteria of a particular implementation. An overall profile of the waveguide is asymmetrical in reference to axis 143 that extends horizontally along diaphragm 110 assuming the loudspeaker assembly 100 is positioned in the vehicle 102 as shown in FIG. 1.

Figure 3:
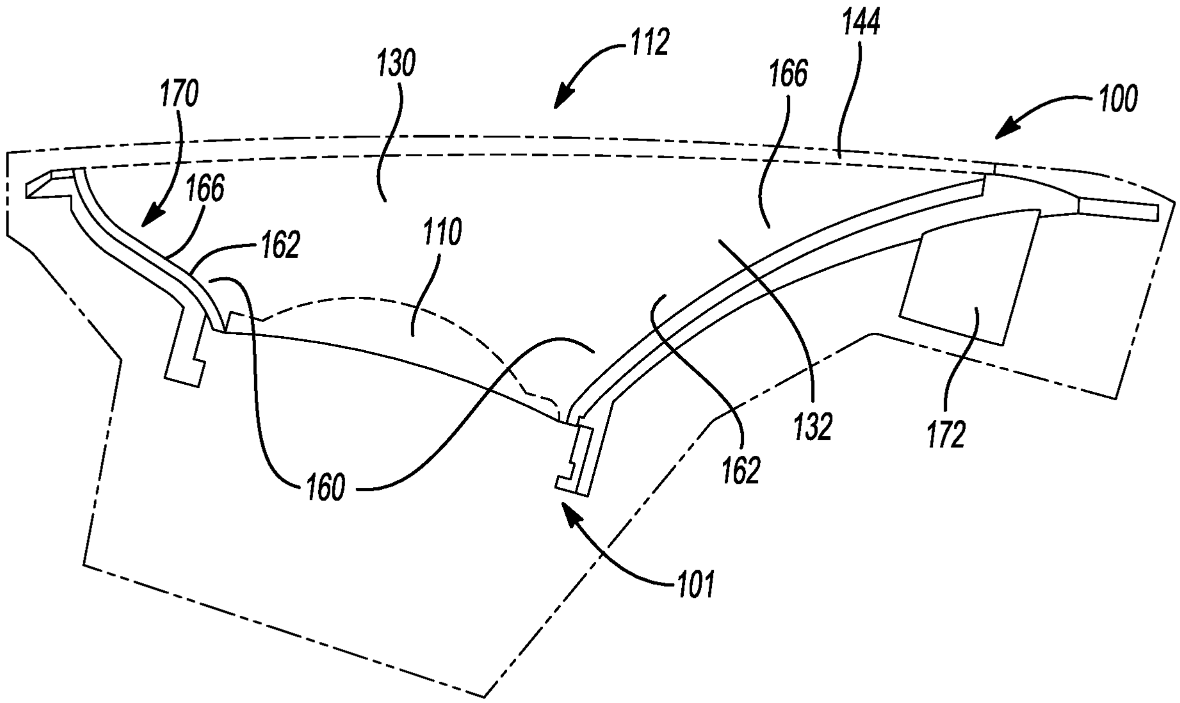
FIG. 3 depicts a first cross-sectional view of the loudspeaker assembly of FIG. 2 in accordance with an embodiment.

FIG. 3 depicts a first cross-sectional view of the loudspeaker assembly 100 of FIG. 2 in accordance with an embodiment. The waveguide 112 includes a throat 160 that surrounds the diaphragm 110. The throat 160 receives the diaphragm 110 and forms a convex surface portion 162 on both the continuous blend 130 and the creased flare 132. The convex surface portion 162 is positioned directly adjacent to the diaphragm 110. The waveguide 112 includes a mouth 166 positioned directly above the throat 160. The convex surface portion 162 is positioned between the mouth 166 and the diaphragm 110.

Figure 4:
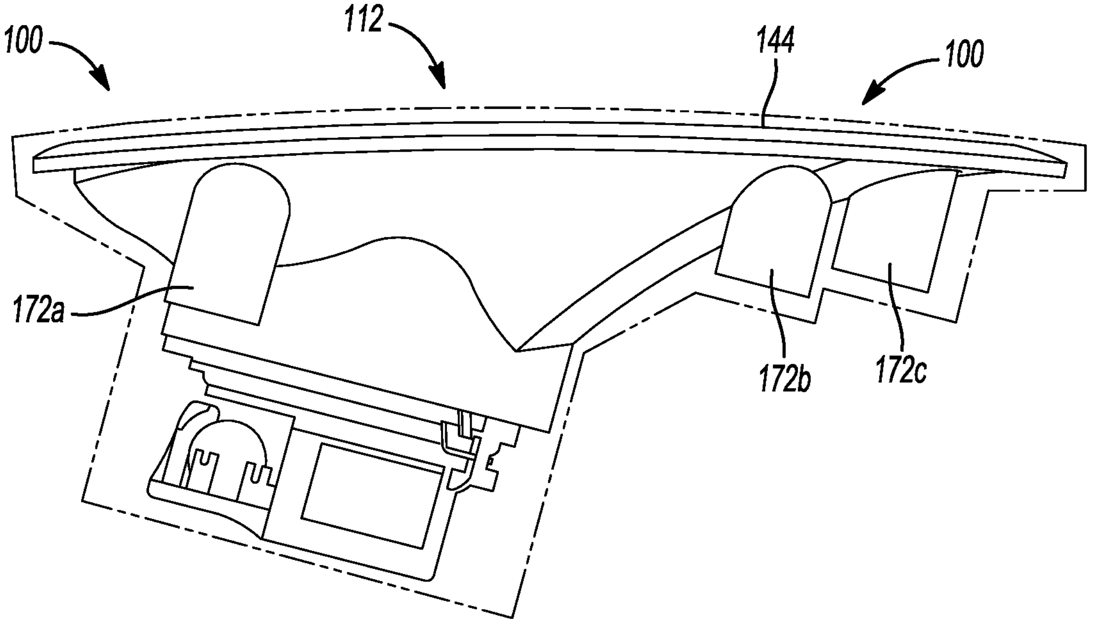
FIG. 4 depicts a second cross-sectional view of the loudspeaker assembly of FIG. 2 in accordance with an embodiment.

The mouth 166 forms a concave surface portion 170 that is positioned between the outer lip 144 and the convex surface portion 162 on at least a portion of the continuous blend 130 As shown in FIG. 3, the creased flare 132 does not include the concave surface portion 170 and the concave surface portion 170 is positioned only on the continuous blend 130 The creased flare 132 extends to a length from an outer perimeter of the diaphragm 110 that is greater than a length in which the continuous blend 130 extends from the outer perimeter of the diaphragm 110. Referring to FIGS. 3 and 4, the waveguide 112 includes a plurality of receiving mechanisms 172*a*-172*n* (or "172") to enable the assembly 100 to be coupled to the vehicle 102. This aspect will be discussed in more detail below.

Figure 5:
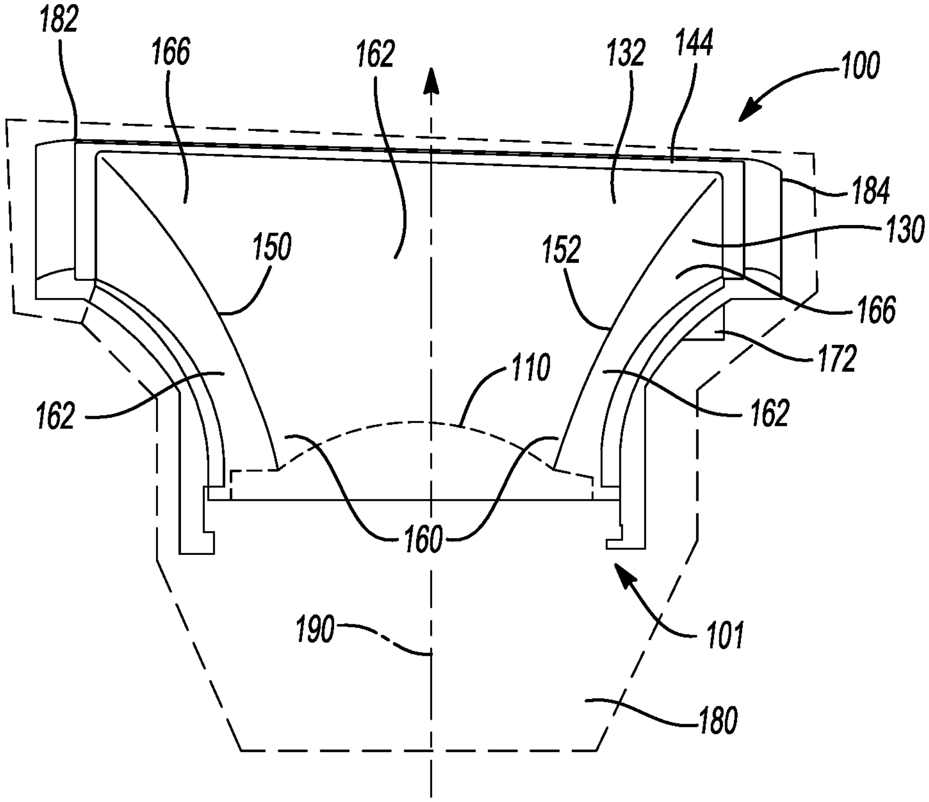
FIG. 5 depicts a third cross-sectional view of the loudspeaker assembly of FIG. 2 in accordance with an embodiment.

FIG. 5 depicts a third cross-sectional view of the loudspeaker assembly 100 of FIG. 2 in accordance with an embodiment. As generally shown in FIG. 5, the continuous blend 130 and the creased flare 132 includes the convex surface portion 162. The loudspeaker assembly 100 includes a connecter 180 for electrically coupling the assembly 100 to the vehicle 102. The outer lip 144 includes a first side 182 and a second side 184. The first side 182 of the outer lip 144 extends to a length from the diaphragm 110 that is greater than a length of the second side 184 to the diaphragm 110 (e.g., see length difference between first side 182 and the second side 184 relative to vertical axis 190). It is recognized that the overall length between the diaphragm 110 and the first side 182 and the second side 184 may also be similar to one another.

Figure 6:
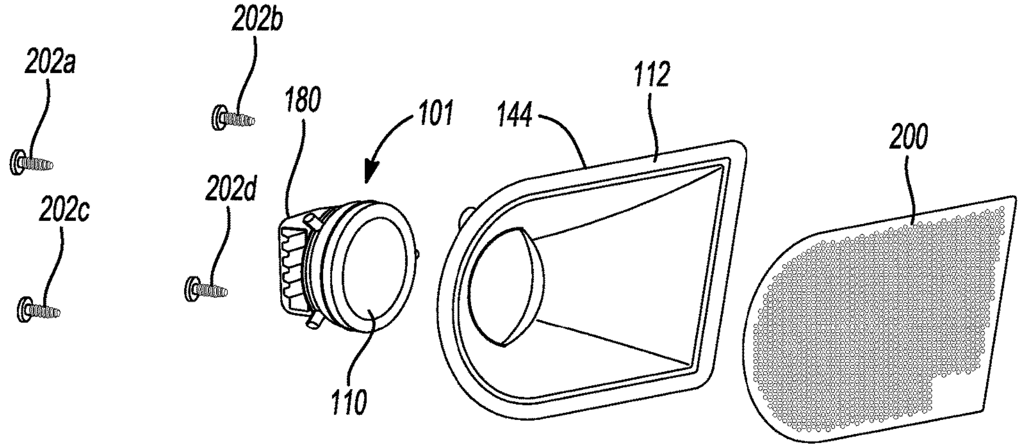
FIG. 6 depicts an exploded view of the loudspeaker assembly in accordance with an embodiment.

FIG. 6 depicts an exploded view of the loudspeaker assembly 100 in accordance with an embodiment. The assembly includes the diaphragm 110, the waveguide 112, a loudspeaker grille 200, and a plurality of fastening mechanisms 202*a*-202*n*. The loudspeaker grille 200 covers the diaphragm 110 and the waveguide 112. In one example, the loudspeaker grille 200 may be positioned on the outer lip 144. The receiving mechanisms 172 receive the fastening mechanisms 202 to couple the loudspeaker assembly 100 to the vehicle 102.

Figure 7:
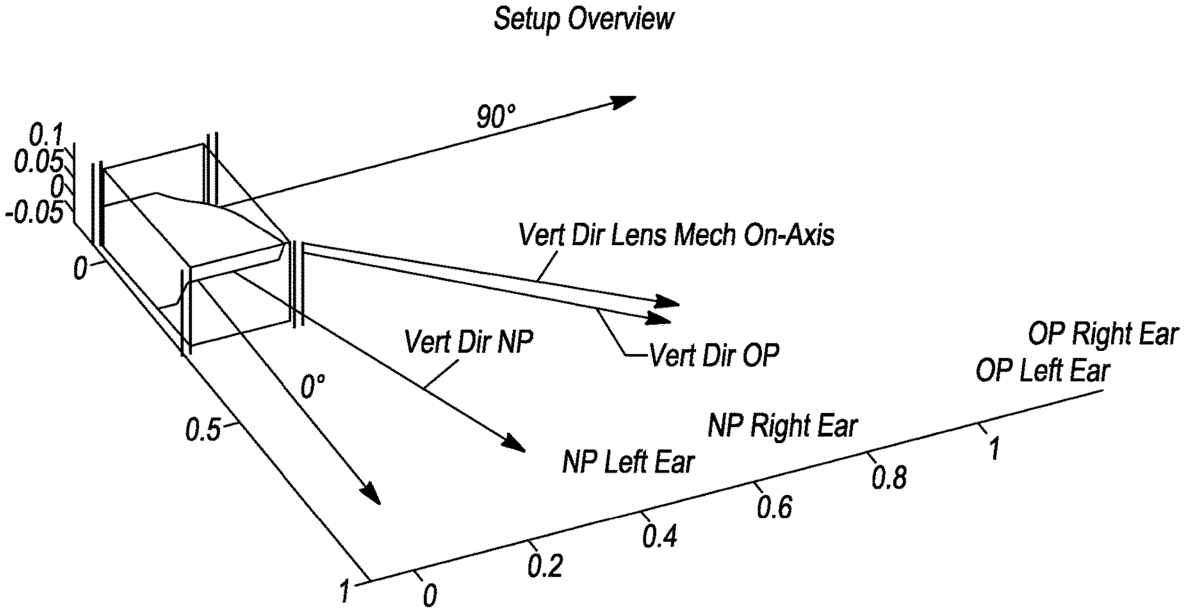
FIG. 7 illustrates various directivity orientations for an audio output from the loudspeaker assembly in accordance with an embodiment.

FIG. 7 illustrates various directivity orientations for an audio output from the loudspeaker assembly 100 in accordance with an embodiment. The waveguide 112 as set forth above, may provide, for example, a coverage angle of the transmitted audio in a range of 35 to 80 degrees both in horizontal and vertical directions. FIG. 6 illustrates that the audio is directed toward an interior of the vehicle 102 towards vehicle occupant(s). In particular, the loudspeaker assembly 100 transmits the audio output to left and right ears for a driver and a passenger in the vehicle 102 and that the loudspeaker assembly 100 is generally effective in mitigating the transmission of the audio output to areas of the vehicle 102 where occupants are not positioned. As shown, the assembly 100 may transmit audio near passenger ("NP") (i.e., passenger closest to assembly 100) and to an opposite passenger ("OP").

Figure 8:
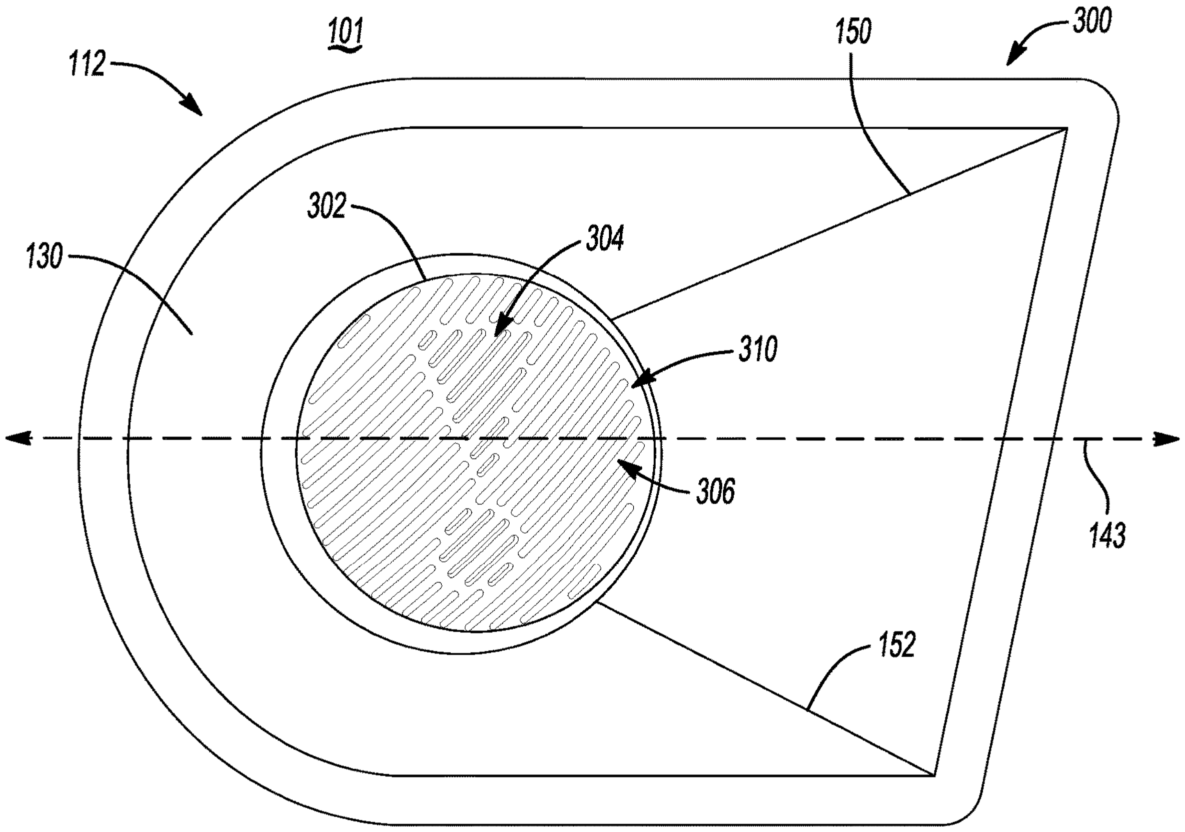
FIG. 8 depicts a front view of another loudspeaker assembly in accordance with an embodiment.

FIG. 8 depicts a front view of another loudspeaker assembly 300 in accordance with one embodiment. The assembly 300 is generally similar to the assembly 100 as illustrated in connection with FIG. 2. However, the assembly 300 includes a grille 302 that is positioned directly over the diaphragm 110. In the embodiment shown in FIG. 8, the grille 302 covers the diaphragm 110 while the waveguide 112 is uncovered (e.g., portions of the continuous blend 130 and the creased flare 132 are uncovered). It is recognized that other embodiments, the grille 302 may cover the diaphragm 110, the continuous blend 130 and the creased flare 132 in similar manner illustrated in connection with FIG. 6. The grille 302 generally includes a first section 304 and a second section 306. As shown, the grille 302 generally defines a plurality of openings 310 to enable audio to pass therethrough.

The openings 310 may be formed in one or more of the first section 304 and the second section 306. The grille 302 as illustrated in FIG. 8 shows that openings 310 are formed in both the first section 304 and the second section 306. In one example, a logo may be formed by the plurality of openings 310 positioned in the first section 304. For example, the first section 304 illustrates that the plurality of openings 310 forms a logo associated with JBL™ audio related products. It is recognized that grille 302 may not require the need for a logo or other identifier in other embodiments.

In general, the grille 302 in addition to the characteristics noted above in connection with the waveguide 112 provide a unique and highly desirable acoustic responds in the vehicle 102. For example, the waveguide 112 in collaboration with the grille 302 may optimize sound where vehicle occupants are located in the vehicle 102. In the vehicle 102, listeners (or occupants) may be positioned, for example, 20 and 80 degrees off-axis from the loudspeaker assemblies 100 or 300. In general, "on-axis" with respect to the loudspeaker assemblies 100 or 300 generally corresponds to an axis that extends outwardly from a centerline of the loudspeaker 101.

The waveguide 112 and the grille 302 serve to improve the off-axis performance of the loudspeaker 101 in the vehicle 102. In general, it may be desirable to improve audio performance for the loudspeaker 101 by taking into account where the occupants are located in the vehicle 102. Such an improvement may be realized by improving the off-axis transmission of the audio into the vehicle 102. The waveguide 112 and the grille 302 provides a better on-axis response compared to prior automotive loudspeaker assemblies that either have a grille or does not have a grille. In general, loudspeaker assemblies that are not equipped with a grille are often considered to be ideal. In addition, while the waveguide 112 improves off-axis performance, it has been found that the grille 302 has provided additional improvement with off-axis performance when added to the waveguide 112. Individually, each of the waveguide 112 and the grille 302 improve the off-axis performance when compared to typical automotive applications.

With the disclosed grille 302, the openings 310 are positioned over the entire surface area of the first section 302 and the second section 304. In general, the openings 302 may be orientated diagonally (or non-perpendicularly) with respect to the axis 143 that extends horizontally and centrally across a front face of the grille 302. The overall width (or predetermined width) of the openings 310 formed in the first section 302 may be different than the width of the openings 310 formed in the second section 304. In one example, an overall thickness of the grille 310 and the corresponding openings 310 may be 1.5 mm (e.g., assuming that the grille 310 is made of plastic) which is considered minimal but still meets automotive standards/best practices. In the event the grille 301 is formed of metal, the overall thickness of the grille 310 may be 0.8 mm. The differing widths between the openings 310 in the first section 304 and the openings 301 in the second section 306, the thickness of the grille 302 being formed at a predetermined thickness, and an overall distance of the grille 310 relative to the loudspeaker 101 may create a unique acoustic response that has similar/improved on-axis performance and improved off-axis performance when compared to grilles that are not equipped with a grille or to conventional automotive grilles. As recognized, given that the waveguide 112 and the grille 302 may be implemented on both the driver side and passenger side of the vehicle, the waveguide 112 and the grille 302 is mirrored when positioned on either side of the vehicle. For example, the waveguide 112 and the grille 302 as shown in connection with FIG. 8 correspond to such features being implemented on a driver side (e.g., left side of the vehicle). When the waveguide 112 and the grille 302 are positioned on the passenger side (e.g., right side of the vehicle), such a waveguide 112 and grille 302 are mirrored with respect to the waveguide 112 and the grille 302 as illustrated in FIG. 8.

The grille 302 is generally recessed within the waveguide 112. The grille 302 may also be surrounded by the continuous blend 130 and the creased flare 132. The outer lip 144 surrounds the continuous blend 130 and the creased flare 132. As noted above, the continuous blend 130 may be formed or shaped in a cone-like manner and the creased flare 132 includes the first crease 150 and the second crease 152 for separating the continuous blend 130 from the creased flare 132. As also noted above, it is recognized that any number of creases may be provided on the creased flare 132. Similarly, the creases may be positioned on the continuous blend 130 instead of the on the creased flare 132. The number of creases positioned on the continuous blend 130 or the creased flare 132 may vary based on the desired criteria of a particular implementation. An overall profile of the waveguide 112 is asymmetrical in reference to the axis 143 that extends horizontally along diaphragm 110 assuming the loudspeaker assembly 100 is positioned in the vehicle 102 as shown in FIG. 1.

Figure 9:
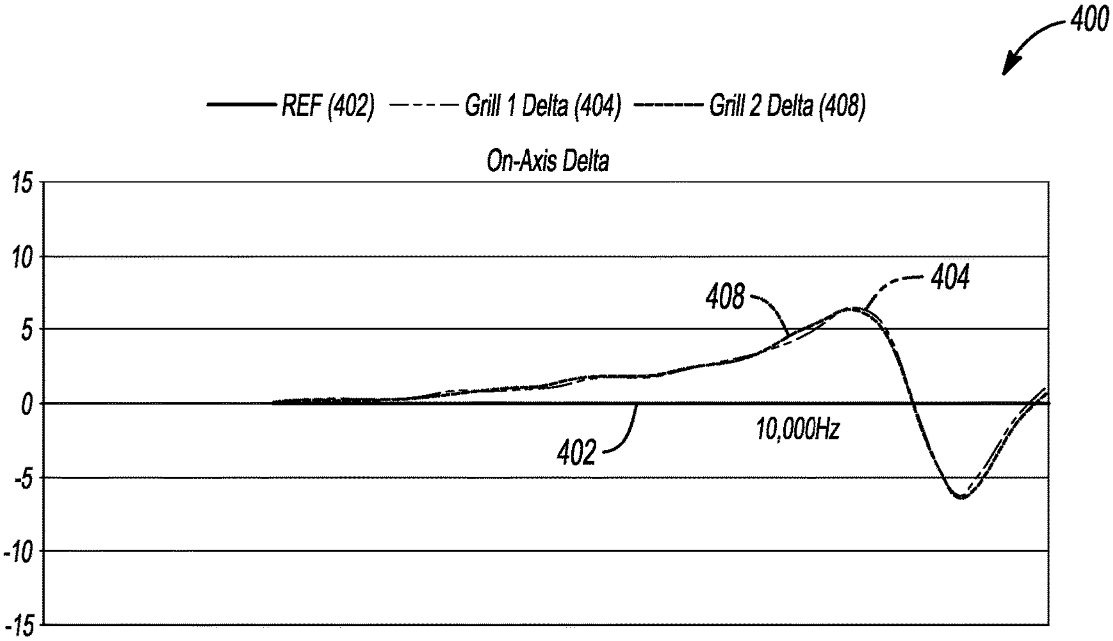
FIG. 9 depicts various on-axis waveforms as provided for different tweeter speaker grilles and for the loudspeaker grille illustrated in connection with FIG. 8 in accordance with one embodiment.

FIG. 9 depicts a plot 400 illustrating various on-axis waveforms as provided for different tweeter speaker grilles and for the loudspeaker grille 302 illustrated in connection with FIG. 8 in accordance with one embodiment. In general, the waveforms 400 includes a reference waveform 402, a first waveform 404 and a second waveform 408. The reference waveform 402 corresponds to a loudspeaker assembly that includes the waveguide 112 and does not include a grille. In general, the audio as output and shown via the reference waveform 402 may not be acceptable for automotive standards but may be considered an ideal case for other applications. The first waveform 404 generally corresponds to an audio output by loudspeaker assemblies that are equipped with the waveguide 112 and a conventional grille. The second waveform 408 corresponds to an audio output provided by the loudspeaker assembly 300 including the grille 302 and the waveguide 112 as set forth above. An on-axis audio performance (or transmission) in connection with the second waveform 408 is better than the performance of the loudspeaker exhibited by the first waveform 404. For example, grilles typically degrade sound quality in general. One objective may be to minimize the impact of the grille so that sound quality can be as high as possible. Grille thickness and open area (e.g., % opening, hole pattern, and where the openings exist) may play advantageous roles in minimizing the impact of the grille.

The disclosed grille 302 includes openings that are positioned in areas thereof along with the waveguide 112 to improve the sound based on the desired response. The sound is allowed to pass on and off-axis in a desired manner by optimizing the open area (ratio) with the pattern.

Figure 10:
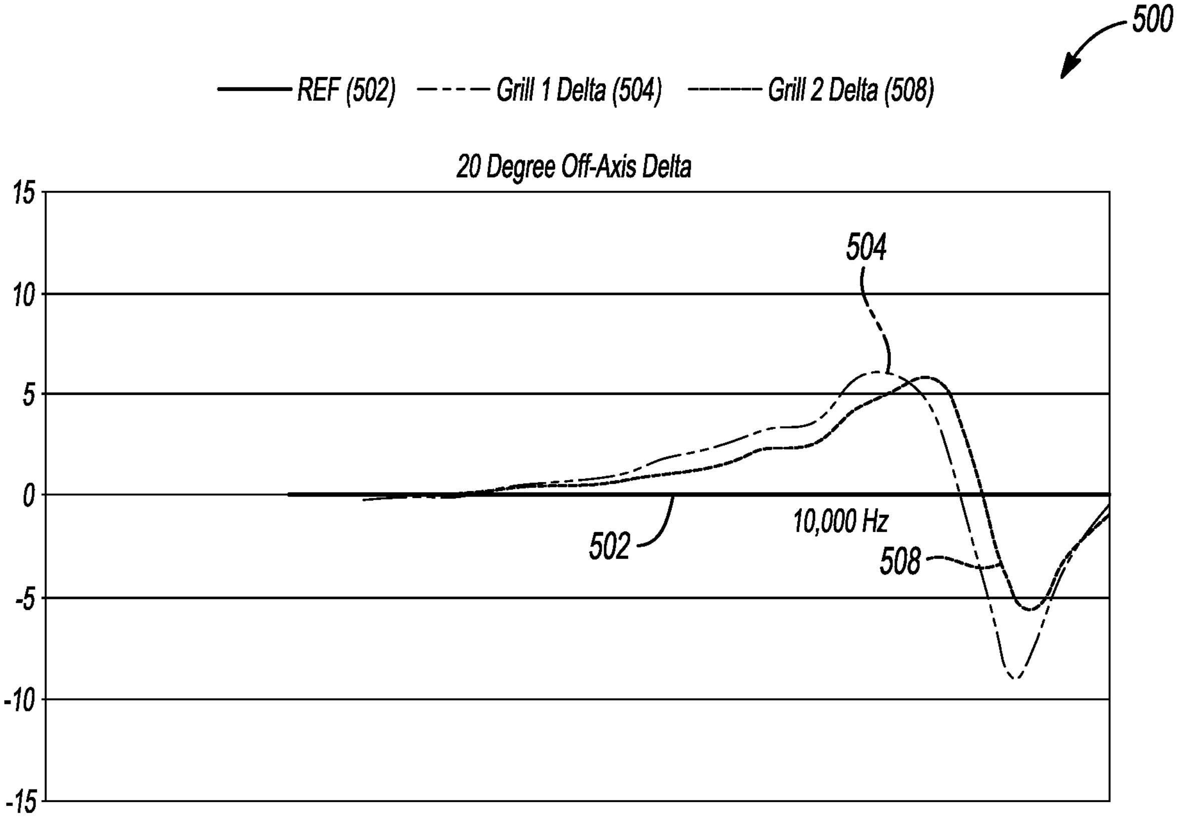
FIG. 10 depicts various off-axis waveforms for a first angle as provided for different tweeter speaker grilles and for the loudspeaker grille illustrated in connection with FIG. 8 in accordance with one embodiment.

FIG. 10 depicts a plot 500 illustrating various off-axis waveforms as provided for different tweeter speaker grilles and for the loudspeaker grille 302 illustrated in connection with FIG. 8 in accordance with one embodiment. The waveforms correspond to a 20 degree off-axis audio transmission. In general, the waveforms 500 includes a reference waveform 502, a first waveform 504 and a second waveform 508. The reference waveform 502 corresponds to a loudspeaker assembly that includes the waveguide 112 and does not include a grille. As noted above, the audio as output and shown via the reference waveform 502 may not be acceptable for automotive standards but may be considered an ideal case for other applications. The first waveform 504 generally corresponds to an audio output by a loudspeaker assembly that is equipped with the waveguide 112 but with a conventional grille. The second waveform 508 corresponds to an audio output provided by the loudspeaker assembly 300 including the waveguide 112 and the grille 302 as set forth above. As shown, the 20 degree off-axis performance in connection with the second waveform 508 is better than the performance of the conventional loudspeaker exhibited by the first waveform 504.

Figure 11:
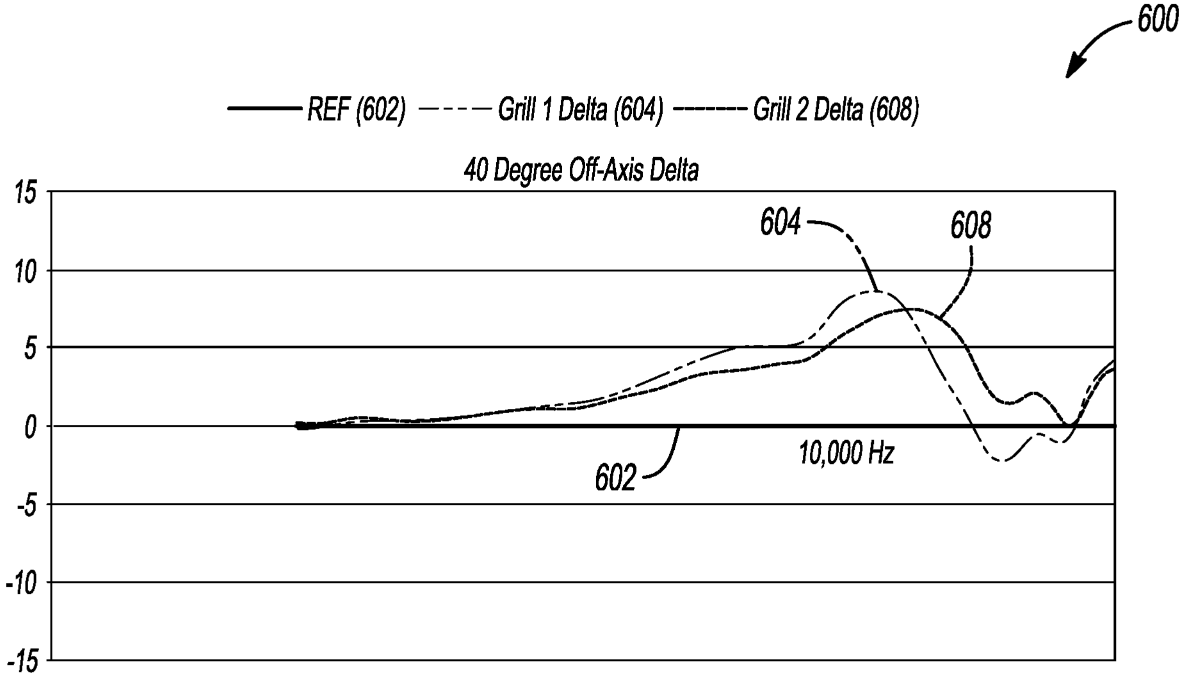
FIG. 11 depicts various off-axis waveforms for a second angle as provided for different tweeter speaker grilles and for the loudspeaker grille illustrated in connection with FIG. 8 in accordance with one embodiment.

FIG. 11 depicts a plot 600 illustrating various on-axis waveforms as provided for different tweeter speaker grilles and for the loudspeaker grille 302 illustrated in connection with FIG. 8 in accordance with one embodiment. The waveforms correspond to a 40 degree off-axis audio transmission. In general, the waveforms 600 includes a reference waveform 602, first waveform 604, and a second waveform 608. The reference waveform 602 corresponds to a loudspeaker assembly that includes the waveguide 112 and does not include a grille. As noted above, the audio as output and shown via the reference waveform 602 may not be acceptable for automotive standards but may be considered an ideal case for other applications. The first waveform 604 generally corresponds to an audio output by a loudspeaker assembly that includes the waveguide 112 and a conventional grille. The second waveform 608 corresponds to an audio output provided by the loudspeaker assembly 300 including the grille 302 and the waveguide 112 as set forth above. As shown, the 40 degree off-axis performance in connection with the second waveform 608 is better than the performance of the first waveform 604.

Figure 12:
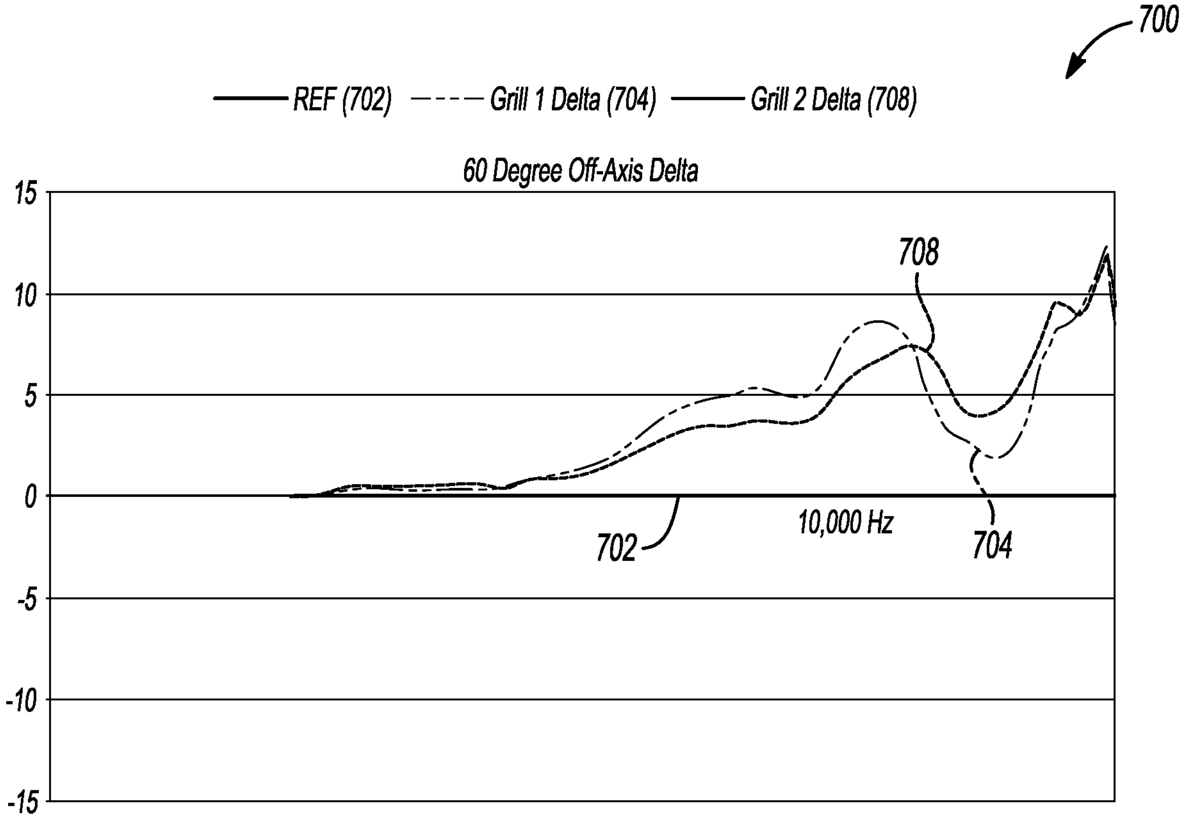
FIG. 12 depicts various off-axis waveforms for a third angle as provided for different tweeter speaker grilles and for the loudspeaker grille illustrated in connection with FIG. 8 in accordance with one embodiment.

FIG. 12 depicts a plot 700 illustrating various on-axis waveforms as provided for different tweeter speaker grilles and for the loudspeaker grille 302 illustrated in connection with FIG. 8 in accordance with one embodiment. The waveforms correspond to a 60 degree off-axis audio transmission. In general, the waveforms 700 includes a reference waveform 702, a first waveform 704, and a second waveform 708. The reference waveform 702 corresponds to a loudspeaker assembly that includes the waveguide 112 and does not include a grille. As noted above, the audio as output and shown via the reference waveform 702 may not be acceptable for automotive standards but may be considered an ideal case for other applications. The first waveform 704 generally corresponds to an audio output by a loudspeaker that is equipped with the waveguide 112 and with a conventional grille. The second waveform 708 corresponds to an audio output provided by the loudspeaker assembly 300 including the waveguide 112 and the grille 302 as set forth above. As shown, the 60 degree off-axis performance in connection with the second waveform 708 is better than the performance of the conventional loudspeaker exhibited by the first waveform 704.

Figure 13:
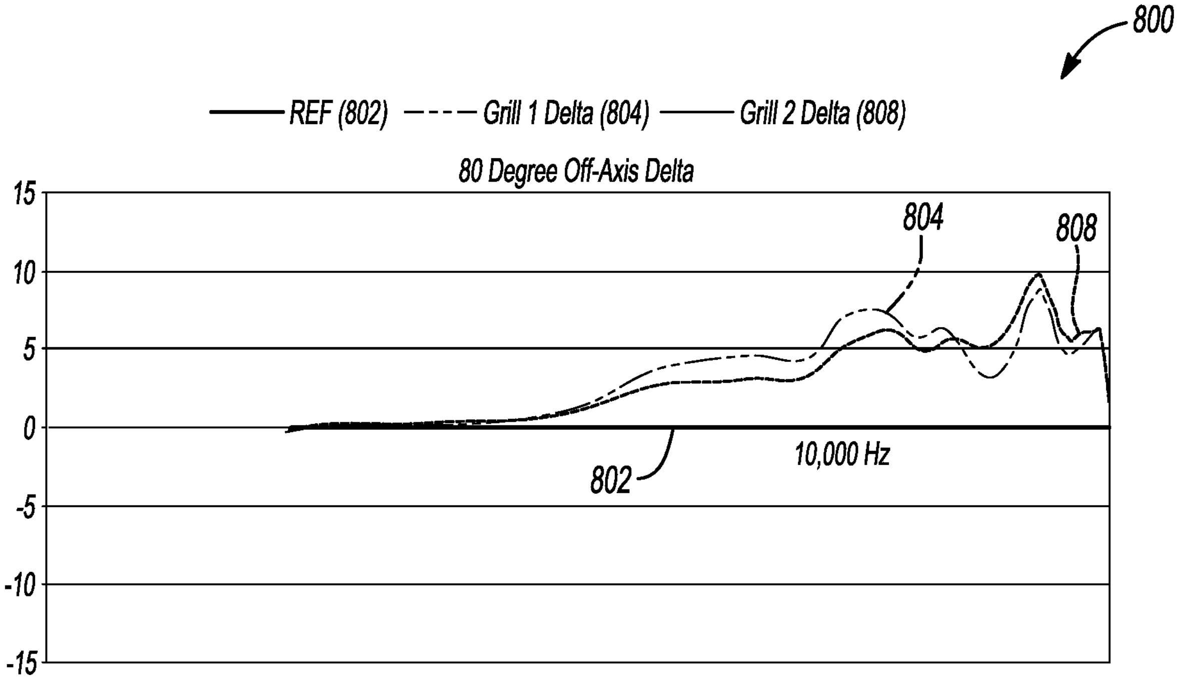
FIG. 13 depicts various off-axis waveforms for a fourth angle as provided for different tweeter speaker grilles and for the loudspeaker grille illustrated in connection with FIG. 8 in accordance with one embodiment.

FIG. 13 depicts a plot 800 illustrating various on-axis waveforms as provided for different tweeter speaker grilles and for the loudspeaker grille 302 illustrated in connection with FIG. 8 in accordance with one embodiment. The waveforms correspond to an 80 degree off-axis audio transmission. In general, the waveforms 800 includes a reference waveform 802, a first waveform 804, and a second waveform 808. The reference waveform 802 corresponds to a loudspeaker assembly that includes the waveguide 112 and does not include a grille. As noted above, the audio as output and shown via the reference waveform 802 may not be acceptable for automotive standards but may be considered an ideal case for other applications. The first waveform 804 generally corresponds to an audio output by a loudspeaker assembly including the waveguide 112 and a conventional grille. The second waveform 808 corresponds to an audio output provided by the loudspeaker assembly 300 including the waveguide 112 and the grille 302 as set forth above. As shown, the 80 degree off-axis performance in connection with the second waveform 808 is better than the performance of the conventional loudspeaker exhibited by the first waveform 804.

Figure 14A:
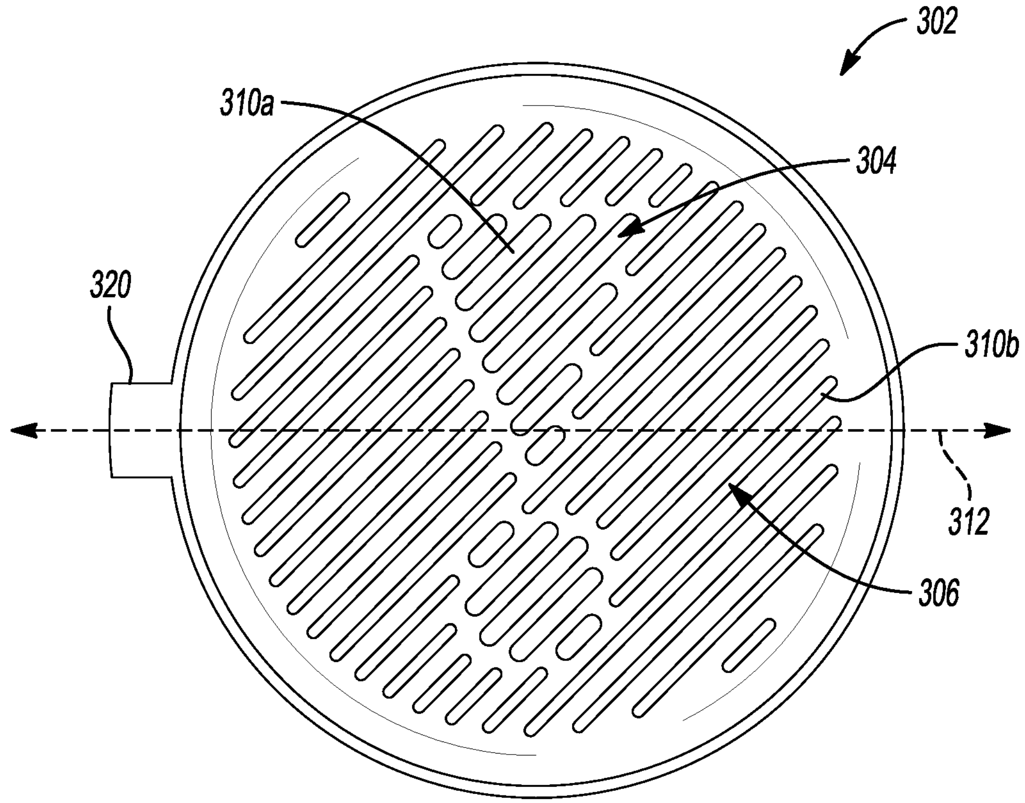
FIGS. 14A-14G depict various views of the loudspeaker grille in accordance with one embodiment.
Figure 14B:
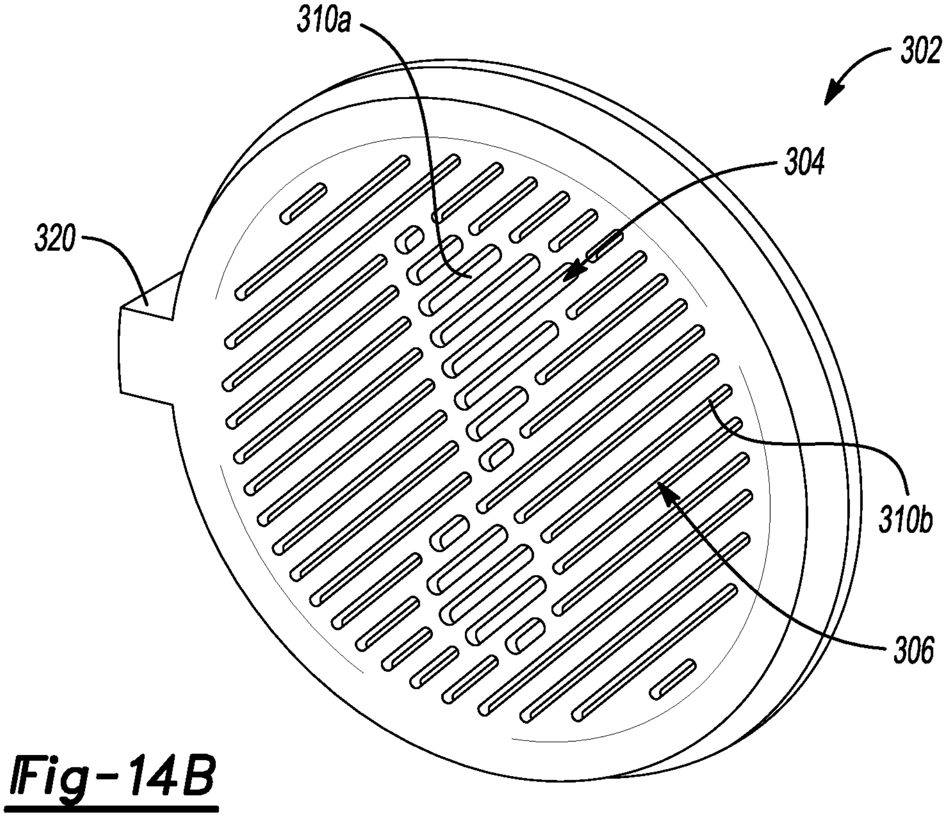
Figure 14C:
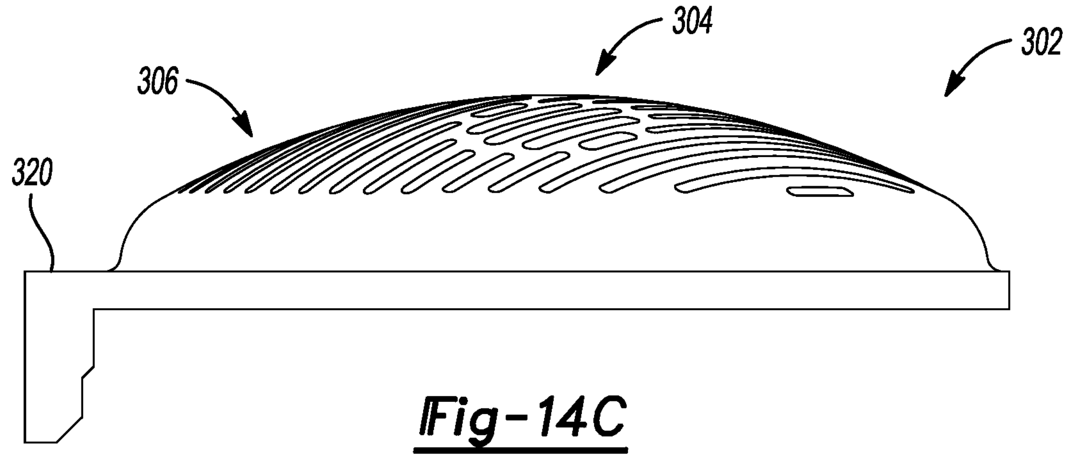
Figure 14D:
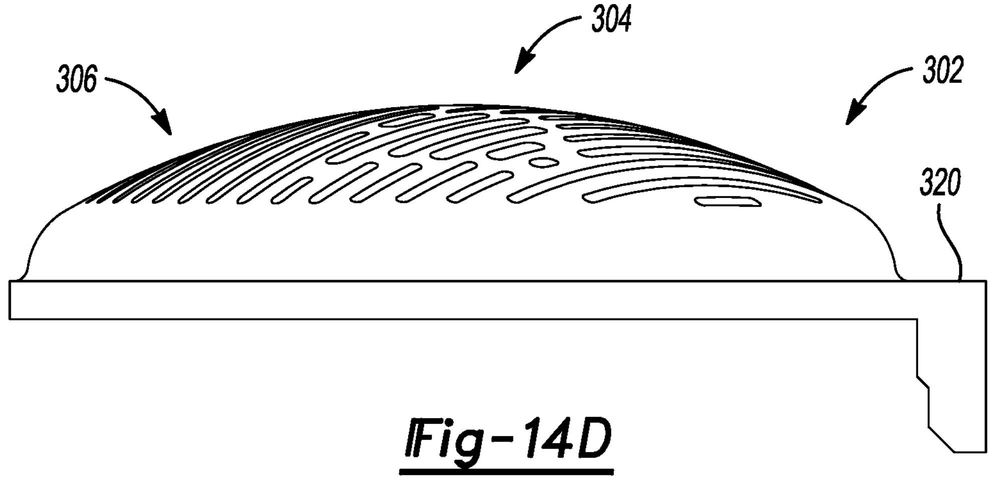
Figure 14E:
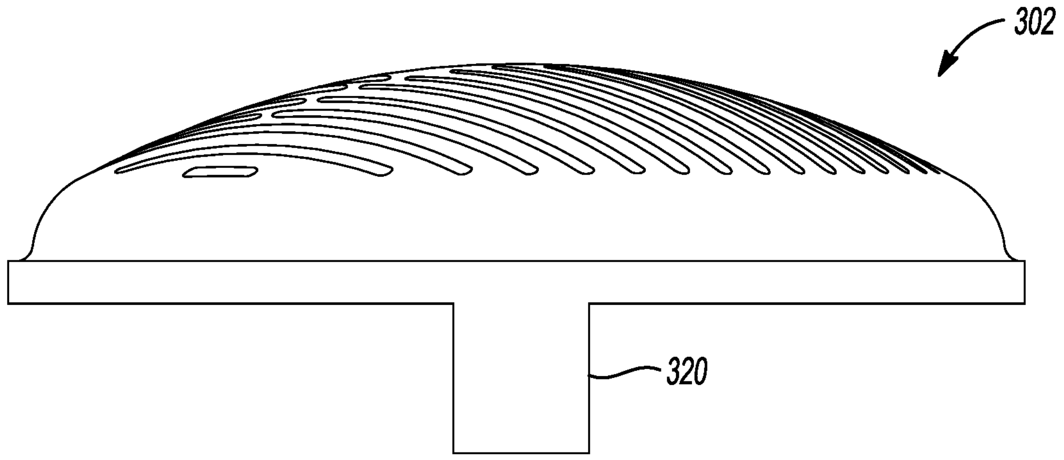
Figure 14F:
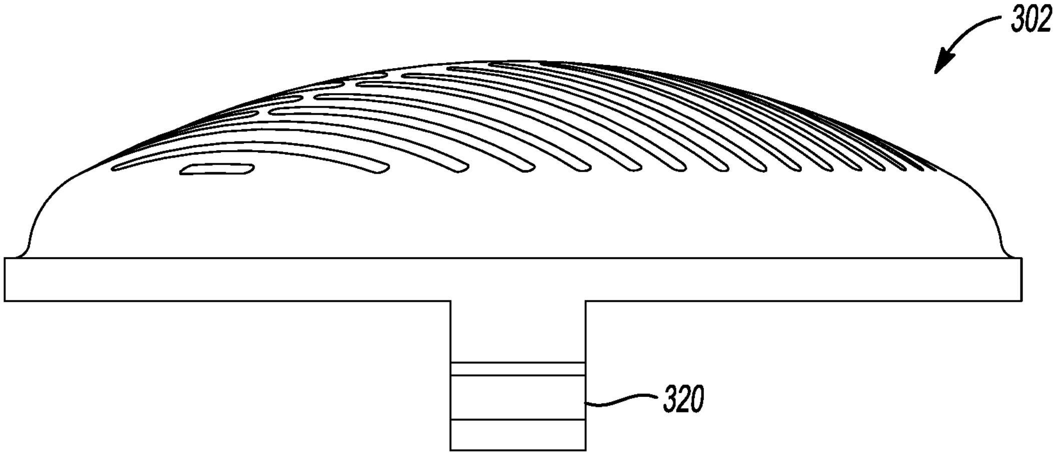
Figure 14G:
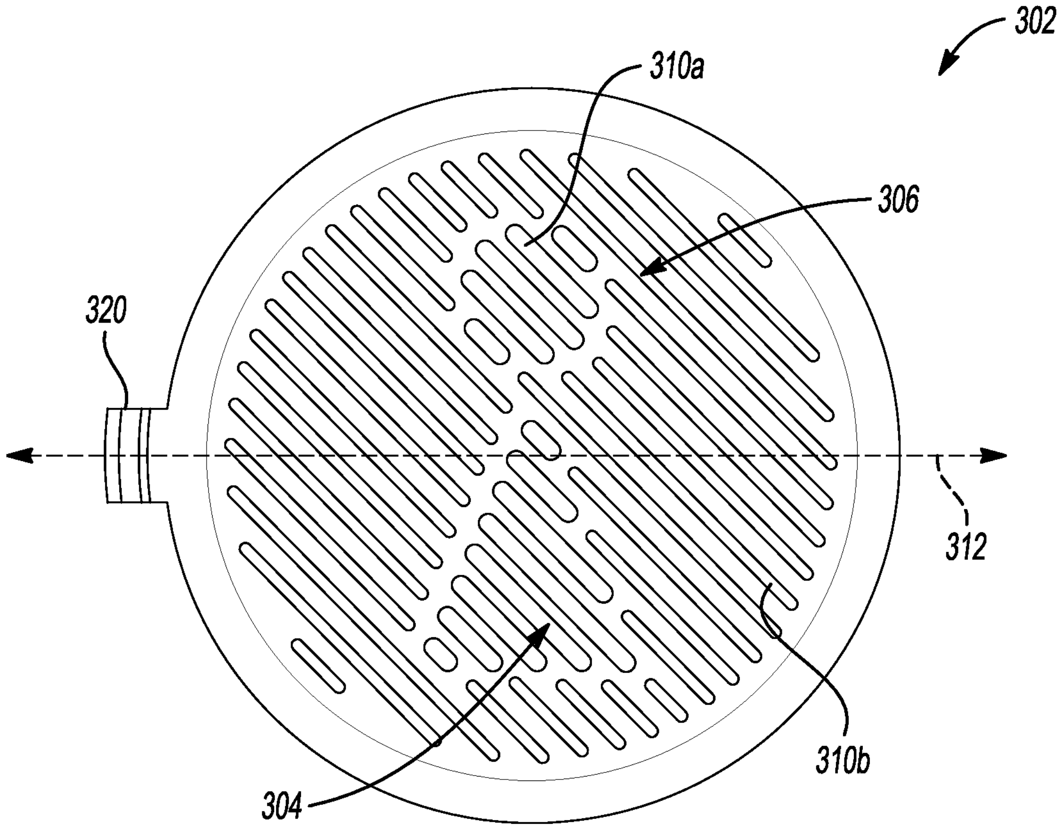

FIGS. 14A-14G depict various view of the loudspeaker grille in accordance with one embodiment. For example, FIG. 14A depicts a front view of the loudspeaker grille 302 in accordance with one embodiment. As noted above, the grille 302 includes the first section 304 and the second section 306. In one example, the first section 304 includes first openings 310*a* and the second section 306 includes second opening 310*b* that differ from the first openings 310*a*.

A center axis 312 extends centrally through the grille 302. Each of the first openings 310*a* and the second openings 310*b* may be orientated diagonally (or non-perpendicularly) with respect to the axis 312 that extends horizontally and centrally across a front face of the grille 302. The overall width (or predetermined width) of the first openings 310*a* formed in the first section 302 may be different than the width of the openings 310 formed in the second section 304. In one example, an overall thickness of the grille 302 and the corresponding first openings 310*a* and the second openings 301*b* may be 15 mm which may be considered minimal but still meets automotive standards/best practices. The differing widths between the first openings 310*a* in the first section 304 and the second openings 310*b* in the second section 306, the thickness of the grille 302 being formed at a predetermined thickness, and an overall distance of the grille 310 relative to the loudspeaker 101 (see FIG. 6 for loudspeaker 101) may create a unique acoustic response that has similar/improved on-axis performance and improved off-axis performance when compared to grilles that are not equipped with a grille or to conventional automotive grilles. The grille 302 may optionally include a tab 320 positioned on thereon, for example, on a side section thereof. The tab 320 may also be a key to ensure proper orientation when being coupled to the waveguide 112. As noted above, the tab 320 may be optional in terms of whether it is present with the assembly 300.

FIGS. 14B-14G illustrate the grille 302 in various orientations. According to an embodiment, an overall ornamental appearance of the loudspeaker grille 302 is illustrated in FIGS. 8 and 14A-14G.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A loudspeaker assembly comprising:

a loudspeaker including a diaphragm to transmit an audio output; and a waveguide being asymmetrical and including a first portion and a second portion, the waveguide at least partially surrounding the diaphragm and configured to control a directivity of the audio output, wherein the first portion and the second portion of the waveguide surround the diaphragm, wherein the waveguide includes a throat positioned on the first portion and the second portion that directly surrounds the diaphragm, wherein the waveguide includes an outer lip positioned on an outer perimeter thereof and a mouth positioned between the outer lip and the throat, wherein the throat forms a convex surface portion positioned directly adjacent to the diaphragm and positioned on the first portion and the second portion, and wherein the mouth forms a concave surface portion positioned adjacent to the convex surface portion on the first portion.

2. The loudspeaker assembly of claim 1, wherein the second portion includes at least one crease to separate the second portion from the first portion.

3. The loudspeaker assembly of claim 1, wherein the second portion extends at a length from the diaphragm that is greater than a length at which the first portion extends away from the diaphragm.

4. The loudspeaker assembly of claim 1, wherein the waveguide is configured to be positioned on one of a mirror sail, a door trim, or a body pillar of a vehicle.

5. The loudspeaker assembly of claim 1, wherein the waveguide is asymmetrical.

6. The loudspeaker assembly of claim 1, wherein the waveguide is configured to provide a coverage angle of the audio output in both horizontal and vertical directions in a vehicle.

7. The loudspeaker assembly of claim 1, wherein the waveguide is further configured to provide a coverage angle of the transmitted audio for 35 to 80 degrees in both horizontal and vertical directions.

8. The loudspeaker assembly of claim 1, wherein the waveguide is further configured to prevent the audio output from being received at one of a front windshield and a door windshield of a vehicle.

9. The loudspeaker assembly of claim 1 further comprising a loudspeaker grille positioned about the waveguide.

10. The loudspeaker assembly of claim 9, wherein the loudspeaker grille includes a first section having a first plurality of openings and a second section having a second plurality of openings, wherein a width of the first plurality of openings is different than a width of the second plurality of openings.

11. The loudspeaker assembly of claim 9, wherein the loudspeaker grille is positioned directly over the diaphragm and being completely surrounded by the waveguide.

12. The loudspeaker assembly of claim 9, wherein the loudspeaker grill is positioned on an outer lip to enclose the diaphragm and an interior surface of the waveguide surrounding the diaphragm.

13. A loudspeaker assembly comprising:

a loudspeaker for being positioned on a mirror sail, a door trim or a body pillar of a vehicle, the loudspeaker including a diaphragm to transmit an audio output in the vehicle; and a waveguide including a first portion and a second portion, the waveguide at least partially surrounding the diaphragm and configured to control a directivity of the audio output in the vehicle, wherein the first portion and the second portion of the waveguide surround the diaphragm, wherein the waveguide includes a throat positioned on the first portion and the second portion that directly surrounds the diaphragm, wherein the waveguide includes an outer lip positioned on an outer perimeter thereof and a mouth positioned between the outer lip and the throat, wherein the throat forms a convex surface portion positioned directly adjacent to the diaphragm and positioned on the first portion and the second portion, and wherein the mouth forms a concave surface portion positioned adjacent to the convex surface portion on the first portion.

14. The loudspeaker assembly of claim 13, wherein the waveguide is asymmetric.

15. A loudspeaker assembly comprising:

a loudspeaker including a diaphragm to transmit an audio output in a vehicle; and a waveguide including a first portion and a second portion, the waveguide at least partially surrounding the diaphragm and being configured to transmit the audio output in both a vertical and horizontal direction in the vehicle, wherein the first portion and the second portion of the waveguide surround the diaphragm, wherein the waveguide includes a throat positioned on the first portion and the second portion that directly surrounds the diaphragm, wherein the waveguide includes an outer lip positioned on an outer perimeter thereof and a mouth positioned between the outer lip and the throat, wherein the throat forms a convex surface portion positioned directly adjacent to the diaphragm and positioned on the first portion and the second portion, and wherein the mouth forms a concave surface portion positioned adjacent to the convex surface portion on the first portion.

* * * * *